(12) United States Patent
Johnson et al.

(10) Patent No.: US 8,050,867 B2
(45) Date of Patent: Nov. 1, 2011

(54) DATA ADAPTIVE VIBRATORY SOURCE ACQUISITION METHOD

(75) Inventors: Marvin L. Johnson, The Woodlands, TX (US); Michael W. Norris, Cypress, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 422 days.

(21) Appl. No.: 12/280,513

(22) PCT Filed: May 2, 2007

(86) PCT No.: PCT/US2007/010794
§ 371 (c)(1),
(2), (4) Date: Aug. 22, 2008

(87) PCT Pub. No.: WO2007/130551
PCT Pub. Date: Nov. 15, 2007

(65) Prior Publication Data
US 2009/0076730 A1    Mar. 19, 2009

Related U.S. Application Data

(60) Provisional application No. 60/797,310, filed on May 3, 2006.

(51) Int. Cl.
*G01V 1/40* (2006.01)

(52) U.S. Cl. .......... 702/13; 702/10; 702/11; 166/250.16

(58) Field of Classification Search ............... 702/13; 166/250
See application file for complete search history.

(56) References Cited

U.S. PATENT DOCUMENTS

| | | | |
|---|---|---|---|
| 3,711,824 A | 1/1973 | Farron et al. | 340/7 |
| 3,895,343 A | 7/1975 | Farr | 340/17 |
| 4,567,583 A | 1/1986 | Landrum | 367/190 |
| 4,616,352 A | 10/1986 | Sallas | 367/190 |
| 5,550,786 A | 8/1996 | Allen | 367/48 |
| 5,715,213 A | 2/1998 | Allen | 367/48 |
| 5,719,821 A | 2/1998 | Sallas | 367/41 |
| 5,790,473 A | 8/1998 | Allen | 367/57 |
| 6,152,256 A | 11/2000 | Favret | 181/111 |
| 6,381,544 B1 | 4/2002 | Sallas | 702/17 |
| 6,651,007 B2 | 11/2003 | Ozbek | 702/17 |
| 6,961,283 B2 | 11/2005 | Kappius | 367/43 |
| 6,980,940 B1 * | 12/2005 | Gurpinar et al. | 703/10 |
| 7,266,456 B2 * | 9/2007 | De Guzman et al. | 702/13 |
| 7,330,401 B2 | 2/2008 | Jeffryes et al. | 367/189 |

* cited by examiner

*Primary Examiner* — Jonathan Teixeira Moffat

(57) ABSTRACT

Method for conducting a seismic survey (23) wherein the acquisition parameters are modified as the survey progresses using information (24) from sensors located to monitor structures and fixtures located in the survey area. The sensor output is compared to acceptable levels, and acquisition parameters such as the seismic source strength are adjusted (26) to prevent exceeding the acceptable levels. An automated arbitration scheme (22) is used to resolve conflicting system goals within survey resource constraints.

14 Claims, 3 Drawing Sheets

DATA ADAPTIVE VIBRATORY SOURCE ACQUISITION METHOD

This application is the National Stage of International Application No. PCT/US2007/10794, filed on 2 May 2007, which claims the benefit of now expired U.S. Provisional Application No. 60/797,310 filed on May 3, 2006.

FIELD OF THE INVENTION

This invention relates generally to the field of geophysical prospecting, and more particularly to seismic data acquisition. Specifically, this invention is a method for improving the quality of seismic data by adapting the characteristics of seismic sources based on ancillary information. A goal-oriented arbitration process is used to select the source adaptations from multiple solution sets.

BACKGROUND OF THE INVENTION

Seismic sources, both vibratory and impulsive, have long been used in the seismic data acquisition industry to generate the acoustic signals needed in geophysical exploration. The conventional use of seismic sources involves several well-understood steps. In the case of vibratory sources, first, one or more vibrators are located at a source point on the surface of the earth. Second, the vibrators are activated for a period of time, typically ranging from four to sixteen seconds, and generate a replicate of the pilot signal. The pilot signal is typically a sweep signal that varies in frequency during the period of time in which the vibrators are activated. Third, seismic receivers are used to receive and record response data for a period of time equal to the sweep time plus a listen time. The period of time over which data is recorded includes at a minimum the time necessary for the seismic signals to travel to and reflect off of the target reflectors of interest, and for the reflected signals to return to the receivers. The recorded signals contain weighted, summed, time delayed, phase rotated and filtered versions of the pilot signal, signals harmonically related to the pilot signal, instrumentation noise and ambient noise. Fourth, seismograms are generated by compressing the longer duration pilot signal to a center weighted wavelet. The most typical means of compressing the recorded data is via cross-correlation with either the pilot signal or a reference sweep. Fifth, the sweep and correlation steps are repeated several times, typically four to eight, and the compressed data are added together in a process referred to as stacking. Finally, the vibrators are moved to a new source point and the entire process is repeated using identically the same acquisition parameters or possibly an alternate predetermined parameter set.

Several problems are known to exist with conventional vibrator technology. First, the correlation process is known to result in correlation side lobes, which can influence the accuracy of the final processed data. Second, vibrator harmonic distortion results in noise, known as harmonic ghosts, after correlation with the pilot. A partial solution to this problem is the use of upsweeping pilot signals, in which the sweep starts at low frequencies and increases to high frequencies. This approach places the correlation ghosts before the main correlation peak where they will not interfere with later, and hence weaker, reflections. In addition, to minimize noise from harmonics, multiple sweeps are performed with incremental phase rotation of the sweeps so that after correlation and stack, the amplitude of the harmonics are reduced. For example, a typical practice to suppress harmonics through the fourth order harmonic would be to use four sweeps with a phase rotation of 360 degrees divided by four, i.e., 0, 90, 180, and 270 degrees. The data are stacked after correlation, with the amplitude of the harmonics accordingly reduced, although not eliminated. The harmonic energy generated by marine and land vibratory sources has traditionally been considered a problem to be eliminated. This is especially true for marine sources when considering the effects of higher frequency signals on ocean mammals. Generally the effects of the harmonic energy is simply ignored or suppressed via adaptive feed forward techniques. Third, in order to accurately process the recorded data, both the sweep time and a listen time must be included in the recording time of the seismic receivers for each sweep. The listen time is important to ensure that the resulting data from each sweep can be accurately processed. In addition, multiple sweeps are often required to inject sufficient energy into the ground. Multiple short sweeps can result in better data quality than long sweeps through the use of phase rotations to reduce harmonic noise and by reducing ground roll reverberations. However, the use of multiple sweeps with each sweep followed by a listening time limits the rate at which energy can be put into the ground and the survey acquired. Fourth, the recording of high frequencies can be limited by the simultaneous recording of the signals from an array of vibrators, each vibrator at a different position and elevation and having a different coupling with the ground. Fifth, vibratory sources often produce large amplitude surface coupled waves. These waves, generally referred to as ground roll, are usually in the 10-30 Hz frequency range and have a slower velocity than the desired seismic reflections which can cause the desired reflection data to be obscured by the ground roll. Due to their large amplitude and low frequency nature, the source generated surface waves have the potential to cause structural damage in structures such as buildings, wells and pipelines. There are several methods currently used to mitigate the effects of surface waves: pseudo-random sweeps and high frequency rate sweeps used as the drive signal, frequency dependent force functions (See U.S. Pat. No. 6,152,256), force limiting and distance limiting. The latter two methods are often employed based on PPV (peak particle velocity) measurements taken at a few locations in the survey area. These methods reduce the energy levels that are available to image the subsurface structures. Distance limiting is a particular concern because it can detrimentally alter the offset and azimuth distributions in the seismic data volume. Without mitigating the effects of ground roll, the effectiveness of the subsurface imaging is severely reduced.

An alternative approach for surface wave mitigation is envisioned by the High Fidelity Vibratory Seismic Method (HFVS) disclosed in U.S. Pat. No. 5,719,821 to Sallas, et al. and U.S. Pat. Nos. 5,790,473 and 5,715,213 and 5,550,786 to Allen. In the HFVS method, the recorded seismic data are not correlated with a pilot signal, but instead are inverted using measured vibrator signatures from each sweep and each vibrator. Because the measured signatures include harmonics, the inversion of the corresponding records recovers those harmonics in the processed data, and thereby does not result in additional noise in the data. Because correlation is not used, correlation side lobes do not exist as a potential problem. Furthermore, inversion with a measured vibrator signature can reduce effects from variable vibrator coupling with the earth. However, in this method the vibrator motion for each data record is measured and used in the processing steps. The HFVS method can be used to record multiple source points simultaneously using a number of vibrators. Techniques to date treat sets of vibrators as units but with HFVS, it is possible to treat a single vibrator as a unit which leads to a heretofore unexamined path of single/multiple unit scheduling. The concept of unit scheduling, though more straightforward with vibratory sources, is equally applicable to impulsive sources.

The separation of a single vibrator's data from the combined data of multiple vibrators allows vibrators to be treated as individual units. Once vibrators are treated as individual units, it is possible to adjust their locations to mitigate surface waves by improved spatial sampling with no additional operating costs.

Data adaptive processes have long been utilized in seismic data acquisition; but have been limited to very local activities such as 1) phase-locking and controlling vibrators and 2) processing the recorded seismic data. U.S. Pat. No. 4,567,583 to Landrum, U.S Pat. No. 3,711,824 to Farron et al. and U.S Pat. No. 4,616,352 to Sallas illustrate the former category and U.S Pat. No. 6,961,283 to Kappius, U.S Pat. No. 6,381,544 to Sallas and U.S Pat. No. 6,651,007 to Ozbek illustrate the latter class of processes that are data adaptive. A data adaptive process may be defined as a process in which one or more control parameters (e.g. a phase shift to lock one signal to another) based on data measurement or measurement statistics. For all of the preceding examples, the source effort and receiver effort are confined to a few predefined parameter sets which are applied to all data acquired. Predominately the recorded data is processed in an adaptive manner without any additional information. Methods described in U.S. Pat. No. 6,381,544 to Sallas and U.S. Pat. No. 3,895,343 to Farr do use ancillary information; but in U.S. Pat. No. 6,381,544 to Sallas, the same parameter set is used for all data and the process adapts to whatever ancillary signal is recorded. In U.S. Pat. No. 3,895,343 to Farr and U.S. Pat. No. 6,381,544 to Sallas, a single source of ancillary information is utilized to alter the source signal and the ancillary information is very local to the energy source. In U.S. Pat. No. 3,895,343 to Farr, the method is not adaptable to impulsive sources. Farr's method does provide a goal oriented solution; but does not provide a method for deciding what to do when goals conflict. Similar arbitration of conflicting goals can be found in unrelated fields such as machine control and process optimization.

SUMMARY OF THE INVENTION

In one embodiment, the invention is a method of operating seismic survey resources including one or more seismic energy sources by adaptive modification of survey acquisition parameters in the course of a survey of an area, said method comprising the steps of: (a) identifying system goals for the survey area and survey resource constraints, setting initial values for acquisition parameters including source operating parameters, and selecting sensor type and location in the survey area for at least one adaptive feedback sensor; (b) activating the seismic energy sources in accordance with the initial acquisition parameters; (c) collecting measurement data from the adaptive feedback sensors; and (d) comparing the sensor data or a quantity extracted therefrom with the system goals, and adjusting the acquisition parameters to reduce any differences. Some embodiments of the invention include, after step (a), a step of determining whether there are any system goals that conflict with each other in light of the initial acquisition parameters and the resource constraints, and resolving the conflict by adjusting at least one of a group consisting of acquisition parameters, system goals and resource constraints. Typically, steps (c)-(d) are repeated as the survey progresses through different source locations. In preferred embodiments of the invention, step (d) is automated by programming a source control computer; defining allowable changes to the acquisition parameters, resource constraints and system goals; inputting the allowable changes to the controller computer, and providing an operator notification when the system goals cannot be met within the allowable changes. In some embodiments, an arbitration scheme is developed to resolve any conflict in system goals, whether at the outset or ongoing, and in preferred embodiments, the arbitration scheme is automated, in which instances ranges of allowable adaptations that can be made to the acquisition parameters are predetermined.

In one embodiment, the invention is an automated method of adaptively modifying a seismic survey of a survey area to achieve survey goals within survey resource constraints, said survey resources including one or more seismic energy sources, said method comprising:

(a) identifying survey goals for the survey area and survey resource constraints, selecting an initial set of acquisition parameters including source operating parameters, and selecting sensor type and location in the survey area for at least one adaptive feedback sensor;

(b) assigning a value to each survey goal;

(c) selecting a minimum acceptable survey value to define satisfying the survey goals;

(d) activating the seismic energy sources in accordance with the selected acquisition parameter set;

(e) collecting measurement data from the adaptive feedback sensors; and (f) comparing the sensor data or a quantity extracted therefrom with the survey goals as the survey progresses, and predicting a probability of satisfying the survey goals within the resource constraints;

(g) if the probability of satisfying the survey goals falls at any time below a pre-selected minimum value, predicting the probability for at least one alternative set of acquisition parameters;

(h) selecting a parameter set with a probability of satisfying the survey goals above the pre-selected minimum value, and returning to step (d); and (i) if no parameter set has a predicted probability of satisfying the survey goals above the pre-selected minimum value, displaying a notice to the effect that the survey cannot be completed within the resource constraints.

In another embodiment, the invention is a method for acquiring a seismic survey when events cause the survey goals to be unattainable with the current parameter set, comprising:

(a) defining a list of survey goals that are ranked by value;

(b) defining a critical value point at which the survey will be terminated;

(c) defining a tolerance for the probability of meeting the system goals;

(d) allocating resources to the survey;

(e) formulating a suite of two or more parameter sets that meet the survey goals utilizing the resources that have been allocated in step (d);

(f) selecting an initial parameter set to use for the data acquisition;

(g) proceeding with acquiring the survey;

(h) predicting the probability of satisfying the survey goals until the survey goals are satisfied or the probability of meeting the survey goals falls below tolerance defined in step (c);

i) evaluating the parameter sets and ranking them by probability of success;

(j) if any parameter sets have a chance of success greater than the tolerance specified in step (c), selecting the parameter set with the highest probability of success and returning to step (g);

(k) creating an ordered list of probability of survey success using in turn each parameter set and omitting items in the list of survey goals starting with the lowest valued items;

(l) if any of the remaining survey goals have a value greater than the critical value point set in step (b), selecting from among those survey goals according to greatest value ranking and returning to step (i); and (m) notifying the survey controller that the survey's critical value point cannot be achieved with the allocated resources.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The method adaptively alters the temporal and/or spectral and/or force and/or operational characteristics of the pilot and/or drive signal(s) and/or unit scheduling based on local and/or remote estimates of the outgoing source or source's effects and signal. In practice, the method will (1) generate an estimation of the effects of the energy source (i.e. via measurements of displacement, velocity, acceleration, angular momentum, pressure and/or pressure gradient) at points local to the energy source(s) and/or at selected remote location(s), (2) determine the variance in the characteristics between the estimated effects and a predetermined effect, (3) compute an updated pilot and/or drive signal and/or unit schedule based on that variance, and (4) use the updated pilot and/or drive signal and/or unit schedule to generate subsequent source signal(s). The temporal/spectral/force/scheduling characteristics of the outgoing source signal can be controlled by instantaneously adjusting 1) the sweep type and/or 2) the sweep rate and/or 3) the signal amplitude and/or 4) the phase of the updated pilot and/or drive signal and/or 5) the unit scheduling. (A unit is the smallest independent source element. In conventional vibroseis data acquisition, the fleet of vibrators constitutes a single unit. For HFVS, each individual vibrator can be treated as a unit, meaning that any single vibrator can be scheduled to operate at any time and in any location, independent of the scheduling of the other vibrators in the fleet.) Reductions in spectral content can potentially be improved by utilizing "HFVS" style phase compression algorithms which can supplement the reduced spectral content with the appropriate frequencies from previously discarded harmonic energy. For example, to reduce the amplitude of ground-roll (reduce potential structural damage), one can change the sweep from a linear change of frequency with time to one that has a higher rate in the part of the frequency band that generates ground-roll. Unfortunately, the trade-off is that this also reduces reflection amplitude in that frequency band. HFVS-style compression can use harmonic energy (that correlation produces as noise) as extra signal to augment the reduced reflection amplitudes in the frequency band.

Figure 1:
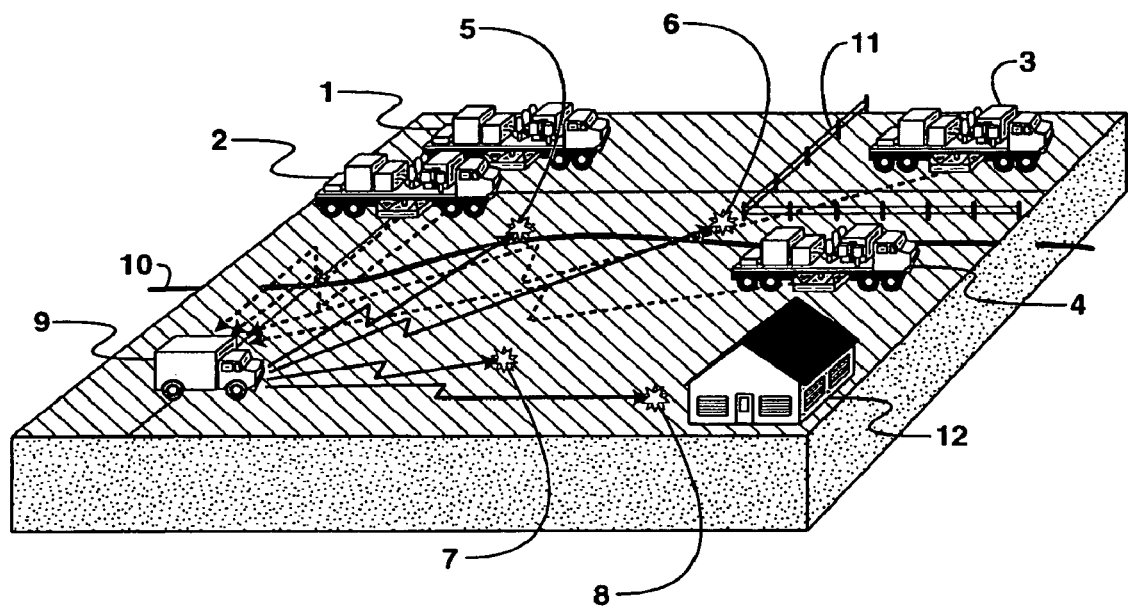
FIG. 1 is a schematic view of an application of the present inventive method, showing vibrators, control, ancillary sensors, communication links and environmental elements.

FIG. 1 schematically illustrates elements in a typical application of the present inventive method. In FIG. 1, the array of seismic sensors has been omitted to simplify the figure; but in normal survey implementations, seismic sensors would be distributed over the surface area and potentially in subsurface areas. (In the previous sentence, the term "seismic sensors" refers to the survey sensors as distinguished from the ancillary or adaptive feedback, sensors that are strategically deployed in the present invention. An adaptive feedback sensor may or may not be a seismic sensor. A survey sensor may possibly double as an adaptive feedback sensor.) FIG. 1 shows four seismic vibrator sources 1-4, four ancillary sensors 5-8, a system controller 9, communication links (broken lines) and three environmental elements (i.e. a buried pipeline 10, an area enclosed by a fence 11 and a building 12).

Figure 2:
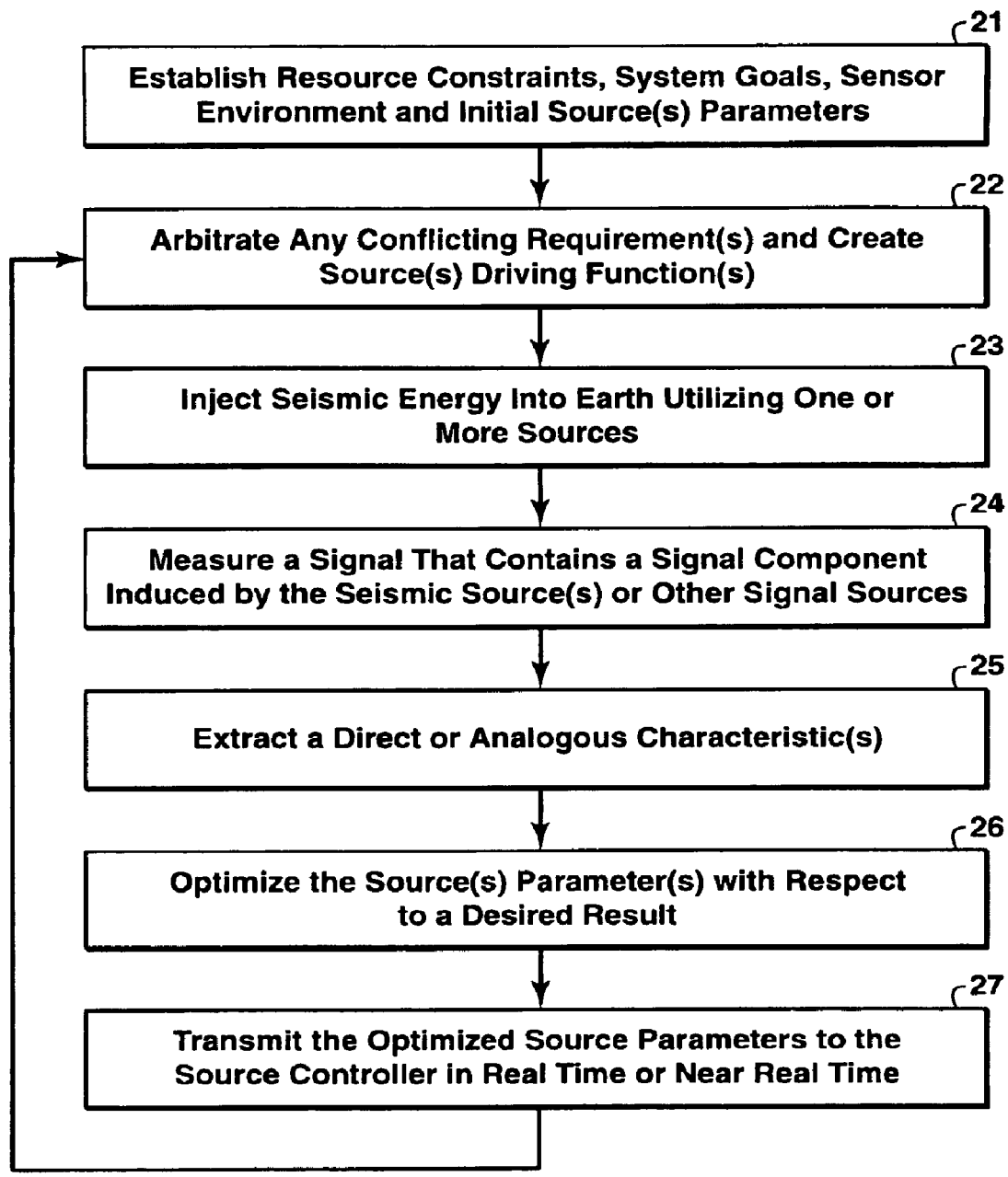
FIG. 2 is a flow chart showing basic steps in one embodiment of the present inventive method.

FIG. 2 illustrates the control flow used in one embodiment of the invention. At step 21, the resource constraints, sensor environment and system goals are defined. (The terms survey goal and system goal are used interchangeably in this document.) Resource constraints are criteria such as the availability and number of energy source units (e.g. vibrators), time budgets and energy levels available from each energy source. Other examples of resource constraints include, without limitation, available personnel and support vehicles, number of survey paths available, and number f survey paths that can be created. The sensor environment includes such items as the types of sensors, the reason the sensor is being deployed, preferred locations for the sensors (typically close to facilities or fixtures identified in the system goals as needing protection), and the processing the sensor's data will undergo. Possible sensor choices include, without limitation, accelerometers, pressure sensors, angular momentum sensors, displacement sensors, pressure gradient sensors, sound pressure sensors, strain gauges, wind velocity, and shear strength sensors, noting that sensor types in the present inventive method are not limited to detecting seismically derived signals.

System goals might include the energy/unit area required for imaging, maximum particle velocity allowed at a structure or facility element and the minimum signal-to-noise ratio required at the zone of interest, including any enhanced requirement for pre-stack azimuth and offset analysis. Other possible system goals include without limitation (a) a criterion based on how much variation an RMS amplitude ratio of a window containing surface waves to a window containing primary reflections may have compared to that of its neighbors; (b) pre-specified polarization and velocity characteristics of surface waves; (c) minimum frequency spectral density values required for imaging of seismic data; (d) minimum and/or maximum offset (source-receiver spacing); (e) maximum survey cost; and (f) maximum number of days to complete the survey. These elements are used to define the initial source and other acquisition parameters, the arbitration scheme and the allowable adaptations that can be made to the acquisition parameter set. Examples of acquisition parameters include, without limitation, (a) number of source (e.g. vibrator) fleets; (b) number of energy sources (e.g. vibrators) per fleet; (c) vibrator sweep duration; (d) number of source frequency bands; (e) power generated by each source (within maximum capability); and (f) time spent acquiring data at each source location. Once these are established, data acquisition can commence. Many of the acquisition parameters are initial values that are changeable as may be indicated in the course of performing the present inventive method, in particular in response to the arbitration step, as further described below. As data acquisition progresses, the parameter set is modified to meet the system goals. If the system goals cannot be obtained within permissible margins, the operators are informed. An obvious benefit of such a system is the ability to generate forecasts and estimates of success.

A useful implementation of the method for vibratory sources would be to adaptively alter the pilot sweep to minimize unwanted effects caused by high amplitude surface waves. The system elements in FIG. 1 are used to illustrate the method. Sensors 5 and 6 are placed in proximity to a buried pipe line. Sensor 7 is placed in an unobstructed environment to establish ambient conditions and sensor 8 is used to monitor effects on the structure. The initial parameter set uses all four vibrators working in tandem and at full output force levels. When that level of output energy would exceed the permissible particle motion for the pipeline buried pipe line, the vibrator configuration might be adaptively changed by the system controller 9 from one fleet of four vibrators to, for example, three fleets where one fleet has two vibrators and the other two fleets have one vibrator each. The first fleet of two vibrators (1 and 2 in the drawing) continues working in the unobstructed area utilizing full force levels. One of the vibrators (vibrator 4) starts working on source locations near the pipe line and the fourth vibrator (3) transits to the fenced in area to start acquiring the source locations in the enclosed area. The force levels, sweep rates, sweep durations and sweep frequencies for each of the vibrator fleets are selectively modified to stay within permissible margins of the system goals.

Figure 3:
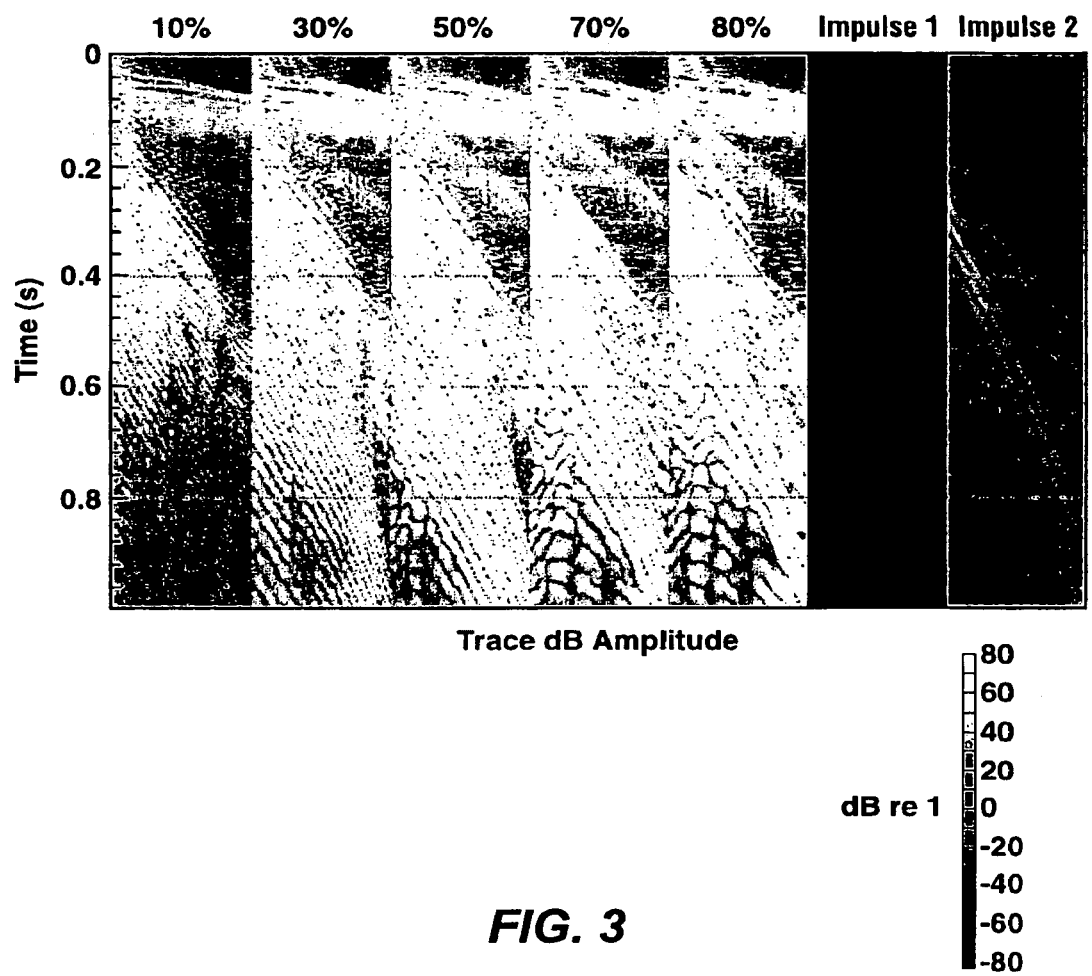
FIG. 3 shows an example of varying force level and source type data that can be used to provide ancillary information for acquisition parameter set creation in the present inventive method.

For any survey such as the above-described scenario, the system goals when evaluated in the context of the resource constraints and the acquisition parameters may create conflicting requirements that can be identified before the seismic sources are activated or that arise later as the survey progresses due to altered circumstances. An example would be the need to limit the peak particle motion seen at the building and the time allotted to acquire the seismic survey. When events cause requirement conflicts to occur, the process attempts to resolve the conflicting requirements. This resolution of conflicting system goals may be called arbitration, and may be performed by human operator decision or by a software program. To illustrate arbitration step 22 for the example, potential solutions could be scheduling the source locations for a time period when the building is not occupied and higher peak particle levels are allowed or reducing the force level generated by the energy sources. The arbitration stage can make use of predefined rules and ancillary information such as when the building will be occupied and previous amplitude measurements such as those shown in FIG. 3 to determine parameter sets that achieve the system goals. FIG. 3 shows results of a force level test where the target force level was raised in increments from 10% of the available force to 80% of the available force. The display shows how increasing the target force level significantly alters the character of surface waves. At target force levels of 50% and above, the extent of the shallow reflectors does not improve. This type of information is used to establish the resource constraints. The arbitration result in this case might be that reducing the force level so as not to exceed 40% of the available force will protect the building yet allow adequate definition of subsurface reflectors, thus enabling the survey to be completed in the allotted time.

As the survey progresses, the need for arbitration may continue to arise (hence, the return arrow to step 22 in FIG. 2). One example is that resource constraints may change such as a vibrator breaking down, causing system goals initially mutually compatible to now be in conflict. The survey can no longer be completed in the allotted time without changing the acquisition parameters or acquiring a new vibrator, or some similar resolution that may be selected by arbitration, possibly from among pre-determined available alternatives. Other examples of altered circumstances that could require arbitration are new restrictions imposed by landowners, unanticipated safety concerns, or equipment move-up rates that are slower than expected.

At step 23, the source parameters for the four sources are adjusted according to the arbitration result (if the initial acquisition parameters, resource constraints, and system goals produce any conflicting requirements), and the resulting seismic signals are transmitted into the ground (with the adaptive feedback sensors positioned at their selected locations in the survey area). At step 24 (shown with following steps for each sensor), sensor measurements are made. As stated, these measurements might, for example, be displacement, velocity, acceleration, angular momentum, pressure and/or pressure gradient measurements, and what is measured might vary from sensor to sensor. At step 25, some characteristic of the measured quantity is extracted, or the quantity itself is selected. At step 26, the measured quantity or a derivative of it is compared to previously determined desirable or acceptable levels for that quantity, and one or more source or other acquisition parameters are adjusted to correct any discrepancy. At step 27, the adjustments to the acquisition parameters are transmitted (in automated embodiments of the invention) to the source controller, preferably in real time, or nearly so. Steps 24-27 are performed for each adaptive feedback sensor. Next, the arbitration step 22 can be repeated to check for and resolve any conflicts resulting from the adjusted source parameters or any system goals or resource constraints that may have been affected by changed circumstances in the interim. Then, the resulting source parameters are made applicable to the energy sources (step 23). The cycle may be ongoing throughout the survey; however, in most embodiments of the invention, the source driving functions would not be changed instantaneously or at arbitrarily short intervals. A reasonable rule might be to refrain from changing source parameters during a sweep, and instead make changes only between records or source points. In practice, most effects resulting in the need to change acquisition parameters occur over hundreds of meters of source point changes, or several minutes of time.

An example of using a directly measured quantity and an example of an indirect, extracted quantity in steps 25-26 are given next.

Most seismic surveys in dense cultural or urban areas (i.e. houses, bridges, pipelines, wells) are constrained to keep the ground velocity less than some governmental specification (i.e. 1.0 in/sec for normal seismic frequencies). This is normally defined with some limited static tests prior to start-up and then all sources are kept a minimum distance from structures—a very blunt method considering that the actual ground motion is (or can be) recorded for every source, making it feasible to vary each source (unit) independently to stay within the guidelines and at the same time, maximize reflection energy. Thus, an example of using a directly measured quantity itself would be to measure the peak particle motion at a structure and (step 27) lower the target force or shorten the sweep if the maximum peak particle motion was exceeded.

An example of an indirect measurement is acquiring surface coupled energy with sparsely spaced (compared to the vertical sensors) multicomponent sensors and extracting the time-variant polarization characteristics.

In preferred embodiments of the present inventive method, most of the steps of the present inventive method are automated (programmed and run on a computer) with human intervention occurring only initially in step 21 and when automated arbitration cannot determine an allowed solution (and the computer so notifies the survey operator). When an acceptable parameter set cannot be derived, the resource constraints may be altered (e.g. add more source units, extend the job duration, or reduce the acceptable minimum signal to noise ratio). Thus, the controller truck 9 in FIG. 2 would contain equipment that performs steps 22 and 25-27. In addition, the controller would trigger step 23 and receive data measured by the adaptive feedback sensors in step 24.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. An automated method of adaptively modifying a seismic survey of a survey area to achieve survey goals within survey resource constraints, said survey resources including one or more seismic energy sources, said method comprising:
   (a) identifying survey goals for the survey area and survey resource constraints, selecting an initial set of acquisition parameters including source operating parameters, and selecting sensor type and location in the survey area for at least one adaptive feedback sensor, wherein the survey goals include at least one of a group consisting of:
   a minimum energy per unit area required for imaging of seismic data;
   a maximum earth particle velocity allowed at a structure or facility element located in the survey area;
   a minimum signal-to-noise ratio for a target subsurface zone, including any stricter requirement for pre-stack azimuth and offset analysis;
   a criterion based on how much variation an RMS amplitude ratio of a window containing surface waves to a window containing primary reflections may have compared to that of its neighbors;
   pre-specified polarization and velocity characteristics of surface waves; and
   minimum frequency spectral density values required for imaging of seismic data;
   (b) assigning a value to each survey goal;
   (c) selecting a minimum acceptable survey value to define satisfying the survey goals;
   (d) activating the seismic energy sources in accordance with the selected acquisition parameter set;
   (e) collecting measurement data from the adaptive feedback sensors; and
   (f) comparing the sensor data or a quantity extracted therefrom with the survey goals as the survey progresses, and predicting a probability of satisfying the survey goals within the resource constraints;
   (g) if the probability of satisfying the survey goals falls at any time below a pre-selected minimum value, predicting the probability for at least one alternative set of acquisition parameters;
   (h) selecting a parameter set with a probability of satisfying the survey goals above the pre-selected minimum value, and returning to step (d); and
   (i) if no parameter set has a predicted probability of satisfying the survey goals above the pre-selected minimum value, displaying a notice to the effect that the survey cannot be completed within the resource constraints;
   wherein steps (f)-(i) are performed using a computer.

2. The method of claim 1, further comprising after the identifying step and before the comparing step:
   determining whether there are any survey goals that conflict with each other in light of the initial acquisition parameters and the resource constraints, and resolving the conflict by adjusting at least one of a group consisting of acquisition parameters and survey goals.

3. The method of claim 1, further comprising repeating steps (d)-(i) as the survey progresses through different source locations.

4. The method of claim 3, further comprising at intervals throughout the survey identifying any changes to the survey goals and resource constraints, determining whether there are any survey goals that conflict with each other in light of current acquisition parameters and the resource constraints, and resolving the conflict by adjusting at least one of a group consisting of acquisition parameters and survey goals.

5. The method of claim 1, wherein the seismic energy sources are vibrators driven by a pilot sweep signal, and the source parameters include at least one of a group consisting of: sweep type; sweep rate; energy transmitted to the earth; and pilot signal phase.

6. The method of claim 1, wherein the sensor types include at least one of a group consisting of: seismic geophones; accelerometers; pressure sensors; angular momentum sensors; displacement sensors; pressure gradient sensors; sound pressure sensors; strain gauges; wind velocity meters; and shear strength sensors.

7. The method of claim 1, wherein sensors are located so as to monitor conditions affecting selected structures and facility elements in the survey area.

8. The method of claim 7 where structures include buildings and facility elements include fences, wells and buried tanks and pipelines.

9. The method of claim 1, further comprising directly before step (i), where no parameter set has a predicted probability of satisfying the survey goals above the pre-selected minimum value, deleting one or more survey goals starting with the lowest valued survey goal, adjusting said minimum acceptable survey value downward, and returning to step (f).

10. The method of claim 1, further comprising directly before step (i), where no parameter set has a predicted probability of satisfying the survey goals above the pre-selected minimum value, adjusting said minimum value downward to a pre-selected alternate value, and returning to step (f).

11. The method of claim 1, wherein the resource constraints include at least one of a group consisting of (a) availability and number of energy source units; (b) survey time budget; and (c) energy levels available from the energy sources.

12. A method for producing hydrocarbons from a subsurface region comprising:
   (i) conducting a seismic survey of the subsurface region in accordance with claim 1;
   (ii) drilling a well into a formation in the subsurface region identified from the survey results as a possible hydrocarbon reservoir; and
   (iii) producing hydrocarbons from the well.

13. An automated method of adaptively modifying a seismic survey of a survey area to achieve survey goals within survey resource constraints, said survey resources including one or more seismic energy sources, said method comprising:
- (a) identifying survey goals for the survey area and survey resource constraints, selecting an initial set of acquisition parameters including source operating parameters, and selecting sensor type and location in the survey area for at least one adaptive feedback sensor;
- (b) assigning a value to each survey goal;
- (c) selecting a minimum acceptable survey value to define satisfying the survey goals;
- (d) activating the seismic energy sources in accordance with the selected acquisition parameter set;
- (e) collecting measurement data from the adaptive feedback sensors; and
- (f) comparing the sensor data or a quantity extracted therefrom with the survey goals as the survey progresses, and predicting a probability of satisfying the survey goals within the resource constraints;
- (g) if the probability of satisfying the survey goals falls at any time below a pre-selected minimum value, predicting the probability for at least one alternative set of acquisition parameters;
- (h) selecting a parameter set with a probability of satisfying the survey goals above the pre-selected minimum value, and returning to step (d);
- (i) where no parameter set has a predicted probability of satisfying the survey goals above the pre-selected minimum value, deleting one or more survey goals starting with the lowest valued survey goal, adjusting said minimum acceptable survey value downward, and returning to step (f); and
- (j) if no parameter set has a predicted probability of satisfying the survey goals above the pre-selected minimum value, displaying a notice to the effect that the survey cannot be completed within the resource constraints;

wherein steps (f)-(j) are performed using a computer.

14. An automated method of adaptively modifying a seismic survey of a survey area to achieve survey goals within survey resource constraints, said survey resources including one or more seismic energy sources, said method comprising:
- (a) identifying survey goals for the survey area and survey resource constraints, selecting an initial set of acquisition parameters including source operating parameters, and selecting sensor type and location in the survey area for at least one adaptive feedback sensor;
- (b) assigning a value to each survey goal;
- (c) selecting a minimum acceptable survey value to define satisfying the survey goals;
- (d) activating the seismic energy sources in accordance with the selected acquisition parameter set;
- (e) collecting measurement data from the adaptive feedback sensors; and
- (f) comparing the sensor data or a quantity extracted therefrom with the survey goals as the survey progresses, and predicting a probability of satisfying the survey goals within the resource constraints;
- (g) if the probability of satisfying the survey goals falls at any time below a pre-selected minimum value, predicting the probability for at least one alternative set of acquisition parameters;
- (h) selecting a parameter set with a probability of satisfying the survey goals above the pre-selected minimum value, and returning to step (d);
- (i) where no parameter set has a predicted probability of satisfying the survey goals above the pre-selected minimum value, adjusting said minimum value downward to a pre-selected alternate value, and returning to step (f); and
- (j) if no parameter set has a predicted probability of satisfying the survey goals above the pre-selected minimum value, displaying a notice to the effect that the survey cannot be completed within the resource constraints;

wherein steps (f)-(j) are performed using a computer.

* * * * *